US012583772B2

(12) United States Patent
Ahmed et al.

(10) Patent No.: US 12,583,772 B2
(45) Date of Patent: Mar. 24, 2026

(54) SUSTAINABLE HYBRID COMPOSITE MADE FROM BIODEGRADABLE POLYMER REINFORCED WITH EXTRACTED POWDER COMPOUND FROM REJECT BRINE (EPC-RB)

(71) Applicant: United Arab Emirates University, Al Ain (AE)

(72) Inventors: Waleed Ahmed, Al Ain (AE); Fatima Aljaberi, Al Ain (AE); Ali Al-Marzouqi, Al Ain (AE); Ameera Mohammad, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/624,730

(22) Filed: Apr. 2, 2024

(65) Prior Publication Data

US 2025/0304475 A1    Oct. 2, 2025

(51) Int. Cl.
| | |
|---|---|
| *C02F 1/52* | (2023.01) |
| *C01F 11/46* | (2006.01) |
| *C02F 1/463* | (2023.01) |
| *C02F 9/00* | (2023.01) |
| *C02F 11/18* | (2006.01) |

(Continued)

(52) U.S. Cl.
CPC ............ *C02F 1/5236* (2013.01); *C01F 11/46* (2013.01); *C02F 1/463* (2013.01); *C02F 9/00* (2013.01); *C02F 11/18* (2013.01); *C01F 11/468* (2013.01); *C02F 11/185* (2013.01); *C02F 2103/08* (2013.01); *C02F 2103/10* (2013.01); *Y02A 20/124* (2018.01)

(58) Field of Classification Search
None
See application file for complete search history.

(56) References Cited

U.S. PATENT DOCUMENTS

| | | | | |
|---|---|---|---|---|
| 11,453,951 B1 * | 9/2022 | Mohammad | ............ | C01C 1/026 |
| 11,814,309 B1 * | 11/2023 | Mohammad | .............. | C01F 5/20 |

(Continued)

OTHER PUBLICATIONS

El-Maghraby et al. Ceramics International, 2010, 36, 1561-1569. (Year: 2010).*

(Continued)

*Primary Examiner* — Clare M Perrin
(74) *Attorney, Agent, or Firm* — MH2 Technology Law Group, LLP

(57) ABSTRACT

There is disclosed a process of developing a sustainable hybrid composite material, comprising the steps of developing the Extracted Powder Compound from Reject Brine (EPC-RB) and producing a Biodegradable Composite from a Biodegradable Polymer (PLA) reinforced with (EPC-RB). The Extracted Powder Compound from Reject Brine (EPC-RB), which is waste product from different industrial processes, serves as a filler or reinforcement within at least one polymer matrix in different ratios to produce a new hybrid composite material with at least one unique property. Further, reinforcing the Extracted Powder Compound from Reject Brine (EPC-RB) in Biodegradable Polymer (PLA) in different ratios enhances the mechanical, thermal, and other properties of the developed sustainable hybrid composite material.

17 Claims, 5 Drawing Sheets

(51) Int. Cl.
   *C02F 103/08* (2006.01)
   *C02F 103/10* (2006.01)

(56) References Cited

U.S. PATENT DOCUMENTS

2014/0069821 A1* 3/2014 Marcin ................... C25B 15/00
                                                    204/240
2017/0368476 A1* 12/2017 Wallace ............... B01D 9/0036

OTHER PUBLICATIONS

Alonso-Lopez et al., Polymers, 2021, 13, 3742. (Year: 2021).*
Serra-Parareda et al. (Polymers, 2021, 13, 3323. (Year: 2021).*
Dhaheer et al. (International Journal of Civil Engineering and Technology, Sep. 2018, 323-334). (Year: 2018).*
Murariu et al. (Polymer, 2007, 48, 2613-2618). (Year: 2007).*

* cited by examiner

100 ⟶

Table 1

| Collected CaSO$_4$ cm$^{-1}$ | Pure CaSO$_4$ cm$^{-1}$ [19] | Collected Al(OH)$_3$ cm$^{-1}$ | Pure Al(OH)$_3$ cm$^{-1}$ [20, 21] | Collected Ca$_3$Al$_2$ cm$^{-1}$ | Pure Ca$_3$Al$_2$ cm$^{-1}$ [18] |
|---|---|---|---|---|---|
| 1123 | 1132 | 1015 | 1019 | 785 | 798 |
| 637 | 616 | 902 | 980 | 714 | 707 |
| 504 | 490 | 881 | 916 | 761 | 756 |
| | | | | 532 | 549 |
| | | | | 360 | 398 |
| | | | | 137 | 170 |

SUSTAINABLE HYBRID COMPOSITE MADE FROM BIODEGRADABLE POLYMER REINFORCED WITH EXTRACTED POWDER COMPOUND FROM REJECT BRINE (EPC-RB)

FIELD OF THE INVENTION

The present invention relates to a method of producing composite material with unique or improved properties, more particularly, a sustainable hybrid composite material. The method includes producing a sustainable hybrid composite from a biodegradable polymer (PLA) reinforced with Extracted Powder Compound from Reject Brine (EPC-RB). This reinforcement enhances the mechanical, thermal, and other properties of the developed sustainable hybrid composite material. This results in a material that is stronger, more durable, and better suited for various applications.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

As we know, the problem associated with producing massive reject brine and its negative environmental impact. Reject Brine, the often-overlooked byproduct of industrial processes like desalination, mining, and chemical production, poses a significant environmental threat that demands urgent attention. While these industries fulfil crucial societal needs, the unintended consequences of reject brine production are far-reaching and multifaceted, impacting ecosystems, water resources, and human health. Reject brine is essentially concentrated wastewater containing elevated levels of salts, minerals, and various chemical compounds. Its massive scale of generation is a consequence of the global demand for fresh water, minerals, and industrial chemicals. However, the disposal and mismanagement of reject brine present a host of environmental challenges that cannot be ignored.

One of the most immediate impacts of untreated reject brine discharge is its effect on aquatic ecosystems. When released into rivers, lakes, or coastal waters, reject brine alters the water's salinity levels and chemical composition. This disrupts the delicate balance of aquatic habitats, harming fish, plants, and other organisms that rely on stable environmental conditions for survival. The decline in biodiversity and the disruption of food chains have long term consequences for ecosystem health and resilience. The improper disposal of reject brine can also lead to soil salinization and contamination of groundwater sources. When brine infiltrates the soil, it increases the salinity levels, making it unsuitable for agriculture and plant growth.

Additionally, the migration of contaminants from brine into groundwater directly threatens human health and can compromise the safety of drinking water supplies in affected areas. Reject brine contains a variety of pollutants, including heavy metals, organic compounds, and toxic chemicals. When discharged into the environment without proper treatment, these pollutants accumulate in soil, water bodies, and sediments, posing risks to human and ecological health. The accumulation of pollutants can lead to long-lasting environmental degradation, making affected areas uninhabitable and unsuitable for agriculture or recreation. The production of reject brine is often energy-intensive, especially in the case of desalination plants. The high energy requirements for desalination contribute to greenhouse gas emissions and exacerbate climate change. Moreover, the discharge of reject brine into coastal waters can disrupt marine ecosystems and exacerbate ocean acidification, further amplifying the impacts of climate change on vulnerable marine species and ecosystems. Addressing the environmental challenges posed by massive reject brine production requires a concerted effort from industry, government, and society as a whole.

Innovative technologies for brine treatment, resource recovery, and waste minimization must be developed and implemented to reduce the environmental impact of reject brine. Additionally, stringent regulations and policies are needed to promote responsible industrial practices and ensure the protection of water resources and ecosystems. The environmental crisis restricting from massive reject brine production demands immediate action and global cooperation. By recognizing the significance of this issue and committing to sustainable solutions, we can mitigate the environmental damage caused by reject brine and move towards a more resilient and sustainable future for generations to come.

SUMMARY OF THE INVENTION

It is an object of the present invention to produce a sustainable hybrid composite with improved properties. A Biodegradable Polymer (PLA) is reinforced with the Extracted Powder Compound from Reject Brine (EPC-RB). Moreover, this EPC-RB can be mixed with any polymer to produce a new composite with improved properties.

In one aspect, the methodology of producing a sustainable hybrid composite as disclosed in the detailed description of present disclosure has two main stages namely, developing the Extracted Powder Compound from Reject Brine (EPC-RB) and producing a Biodegradable Composite from a Biodegradable Polymer (PLA) reinforced with Extracted Powder Compound from Reject Brine (EPC-RB). The production of the biodegradable composite includes two main stages for preparing samples for Tensile and Compressive testing, as well as mechanical properties of the testing.

In another aspect, the present disclosure shows procedure and verification to extract and verify the Extracted Powder Compound from Reject Brine (EPC-RB), to be used with a Biodegradable polymer to produce a sustainable composite material. The extracted powder compounds (EPC-RB) from reject brine serves as a filler or reinforcement within any polymer matrix, enhancing the mechanical, thermal and other properties of the developed composite material. This results in a material that is stronger, more durable, and better suited for various applications. The composition and properties of the hybrid composite may be tailored based on the specific requirements of different applications. By adjusting the ratio of polymer to reinforcement and incorporating different types of extracted powder compounds (EPC-RB), the composite may be optimized for various uses.

In yet another aspect, the present invention discloses that the optimal/moderate percentage of the EPC-RB, preferably 10%, enhances the tensile strength and stiffness, and maximizes the modulus of elasticity of the composite material, thus contributing to the mechanical behaviour of the material under tension. However, after reaching the peak strength at 10% EPC-RB, the strength of the composite material begins to decrease. This decline in strength suggests that there might be an optimal concentration or ratio of EPC-RB beyond which its beneficial effects diminish or even become detrimental to the mechanical properties of the composite. This observation is crucial for understanding the composite material's mechanical behaviour and structural integrity in various applications. Similarly, the optimal/moderate percentage of incorporating EPC-RB into a Biodegradable Polymer for increasing the compressive strength and Elastic Modulus in Compression is 30% after that it starts to reduce.

The present disclosure is advantageous over the conventional prior arts as producing a sustainable hybrid composite from a biodegradable polymer reinforced with extracted powder compound from reject brine has many environmental benefits. The composite produced using this method is a biodegradable composite material that decomposes naturally in the environment. Using biodegradable polymers reduces reliance on fossil fuels and decreases the environmental impact associated with traditional plastics. Moreover, Extracted Powder Compound from Reject Brine (EPC-RB) is a byproduct generated during various industrial processes such as desalination, mining, and chemical production. It contains dissolved salts, minerals, and other compounds that are typically considered waste. Further, the method of producing a biodegradable composite material as disclosed in the present invention reduces dependence on non-renewable resources and helps divert waste from landfills or waterways, so it promotes environmental sustainability. Further, as disclosed the composition and properties of the hybrid composite can be tailored based on the specific requirements of different applications. By adjusting the ratio of polymer to reinforcement and incorporating different types of extracted powder compounds (EPC-RB), the composite can be optimized for various uses.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
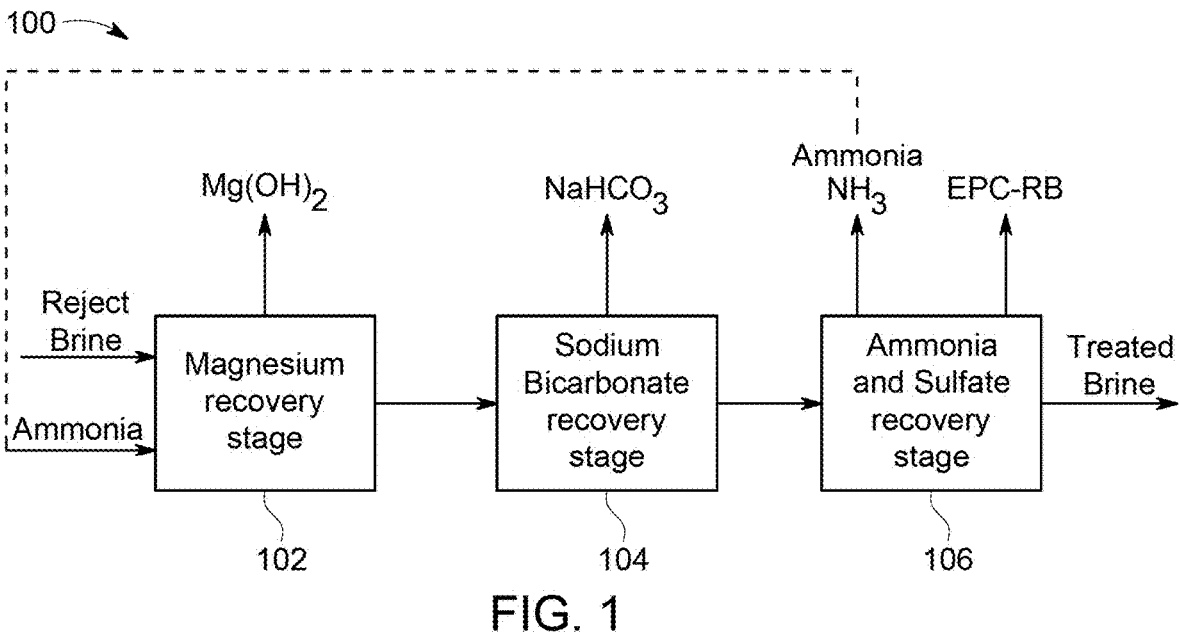
FIG. 1 illustrates a flow chart for the processes involved to the treated brine to reach the sulfate solid products (EPC-RB), in accordance with an embodiment of the present invention.

The aspects of the proposed system and method for producing a sustainable hybrid composite material from a Biodegradable polymer reinforced with Extracted Powder Compound from Reject Brine (EPC-RB), that is typically considered a waste product of industrial processes like desalination and chemical production, contains dissolved salts, minerals, and other compounds that are often discarded without proper utilization, according to the present invention will be described in conjunction with FIG. 1-8. By extracting the valuable components from reject brine, the waste can be transformed into an invaluable resource. The Extracted Powder Compound from Reject Brine (EPC-RB) mixed with a Biodegradable Polymer (PLA) represents a unique, sustainable composite material. In use, EPC-RB serves as a filler or reinforcement within a polymer matrix in different ratios to produce a new hybrid composite material with at least one unique property. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

In accordance with an embodiment of the proposed invention, a process of developing a sustainable hybrid composite material, comprising the steps of developing the Extracted Powder Compound from Reject Brine (EPC-RB); and producing a Biodegradable Composite from a Biodegradable Polymer (PLA) reinforced with Extracted Powder Compound from Reject Brine (EPC-RB).

The proposed methodology shows procedure and verification to extract and verify the Extracted Powder Compound from Reject Brine (EPC-RB), to be used with a Biodegradable polymer to produce a sustainable composite. This EPC-RB may also be mixed with any polymer to produce a new composite with unique properties/with a biodegradable polymer (PLA) to produce a sustainable hybrid composite. A primary objective of the present invention is to create a sustainable hybrid composite (material that decomposes naturally in the environment) from a biodegradable polymer reinforced with extracted powder compound from reject brine. The Extracted Powder Compound from Reject Brine (EPC-RB) is a compound produced from the Reject Brine that is generated during various industrial processes such as desalination, mining, and chemical production. It contains dissolved salts, minerals, and other compounds that are typically considered waste. The extracted powder compounds (EPC-RB) from reject brine serves as a filler or reinforcement within any polymer matrix, enhancing the mechanical, thermal and other properties of the developed composite material. This results in a material that is stronger, more durable, and better suited for various applications. The composition and properties of the hybrid composite may be tailored based on the specific requirements of different applications. By adjusting the ratio of polymer to reinforcement and incorporating different types of extracted powder compounds (EPC-RB), the composite may be optimized for various uses. Regarding (EPC-RB), any developed composite from (EPC-RB) and any driven compound from it may be used to produce sustainable composites for different applications, whether with PLA or other polymers or materials.

In accordance with an embodiment of the present invention, there are proposed two main stages: developing the Extracted Powder Compound from Reject Brine (EPC-RB) and producing a Biodegradable Composite from a Biodegradable Polymer (PLA) reinforced with Extracted Powder Compound from Reject Brine (EPC-RB), including two main stages for preparing samples for Tensile and Compressive testing, as well as mechanical properties of the testing.

A method of developing the Extracted Powder Compound from Reject Brine (EPC-RB) comprises the following steps: a) A 1000 ml reject brine solution sample was systematically mixed with $NH_4OH$ solution at specific molar ratios (3.34 $NH_3$:1 NaCl) over a five-minute duration to induce the precipitation of magnesium content. This process involved the reaction of $NH_3$ with magnesium carbonate ($MgCO_3$), a predominant component in the rejected brine. The resultant reaction yielded a composite of $NH_4HCO_3$ and magnesium hydroxide. b) The initial pH of the brine-ammonia mixture was monitored, followed by a 24-hour agitation period on a shaker at a controlled temperature of 15° C. Post-shaking, the samples underwent filtration utilizing the Buchner funnel setup, and the accrued solids were subjected to drying at 120° C. for 24 hours. The treated brine underwent a reaction with a $CO_2$-air gas mixture in accordance with the Solvay process, employing a novel inert particle spouted bed reactor (IPSBR). The reaction concluded when the $CO_2$ concentration at the reactor gas outlet matched its inlet value, indicating saturation. c) Filtration of the collected mixture separated liquid from solids. In this stage, a novel recovery process for ammonia ($NH_4Cl$) and sulfate ($SO_4^{2-}$) content was introduced, utilizing compact sulfate chemical precipitation and ammonia stripping in the presence of CaO. This process occurred within a closed electrocoagulation cell, consolidating the recovery steps. Treated brine from previous stage, post-filtration, was introduced into the electrocoagulation cell, initiating reactions to mainly recover sulfate as gypsum ($CaSO_4$) products which considered the main component of the EPC-RB product. d) Within the electrocoagulation cell, the compact sulfate precipitation and ammonia stripping occurred through an electrochemical process with aluminum electrodes. The current was applied after adding CaO to the treated brine, with a concentration of 3.5 g/100 ml brine. The electrochemical reaction persisted for five hours to maximize over all recovery. After each run, the treated brine underwent a settling period of 24 hours for complete coagulation at room temperature, followed by filtration using a Buchner funnel kit to isolate solid coagulants. e) Subsequently, the solid products (EPC-RB) were dried at 120° C. for 24 hours and subjected to identification and analysis.

The composite material under examination consists of PLA as the matrix material, with EPC-RB mixed with it. It is observed that the composite contains 10% of EPC-RB reaches its maximum strength at 37 MPa. This indicates that the addition of EPC-RB at this concentration enhances the tensile strength of the composite material. Although the composite with 10% EPC-RB exhibits improved strength, it's noted that this strength is still less than that of pure PLA. It is implied that including EPC-RB in the composite material contributes to its biodegradability, making it more environmentally friendly than pure PLA. This aspect is crucial in many applications, especially those concerning sustainability and environmental impact. It is noted that after reaching the peak strength at 10% EPC-RB, the strength of the composite material begins to decrease. This decline in strength suggests that there might be an optimal concentration or ratio of EPC-RB beyond which its beneficial effects diminish or even become detrimental to the mechanical properties of the composite.

Similar to the trend observed in tensile strength, it is indicated that the modulus of elasticity reaches its max value 3.2 GPa at 10% EPC-RB and starts to decrease beyond the 10% concentration of EPC-RB. However, this is lower than pure PLA. This decline implies that while small amounts of EPC-RB improve the stiffness of the composite, higher concentrations might lead to a decrease in stiffness or possibly alter the material's structure in a way that reduces its resistance to deformation. The observation concludes that an optimal concentration of EPC-RB maximizes the composite material's modulus of elasticity. Beyond this concentration, the additional EPC-RB may not contribute positively to the stiffness of the material or may introduce other factors that offset the improvements seen at lower concentrations. The trend observed in the modulus of elasticity is often related to the trend in tensile strength. Both properties contribute to the overall mechanical behavior of the material under tension, and changes in one property can usually influence the other. In this case, both tensile strength and modulus of elasticity show similar trends with the addition of EPC-RB. Regarding the compressive strength, it is observed that the max value at 30% EPC-RB reaches 40.1 MPa and reduces after that. On the other hand, the modulus of elasticity at compression has a max value of 30% as well at 3 GPa.

In accordance with an embodiment of the proposed invention, a method 100 is used as illustrated in FIG. 1 of producing the sustainable hybrid composite material comprising the steps of developing the Extraction Powder Compound from Reject Brine (EPC-RB); producing a Biodegradable Composite from a Biodegradable Polymer (PLA) reinforced with Extracted Powder Compound from Reject Brine (EPC-RB) and verifying the extracted Extraction Powder Compound from Reject Brine (EPC-RB). The main component of Extraction Powder Compound from Reject Brine (EPC-RB) is gypsum.

The method 100 illustrates three (3) steps being involved in formation of the EPC-RB. The stages as illustrated in FIG. 1 are a Magnesium Recovery Stage 102, a Sodium Bicarbonate recovery stage 104, and an ammonia & sulfate recovery stage 106.

Furthermore, in accordance with an embodiment of the present invention, the method includes the steps of mixing a sample of reject brine solution with Ammonium Hydroxide (NH4OH) to induce the precipitation of magnesium content. This process involved the reaction of $NH_3$ with magnesium carbonate ($MgCO_3$), a predominant component in the rejected brine. The resultant reaction yielded a composite of $NH_4HCO_3$ and magnesium hydroxide. This stage is referred to as the Magnesium Recovery Stage 102 in the FIG. 1 and this stage forms a treated brine solution. The treated brine solution obtained in the first step as mentioned above is reacted with Carbon Dioxide ($CO_2$) air gas mixture at the Sodium Bicarbonate recovery stage 104. The method further includes filtering the collected mixture obtained from the the Sodium Bicarbonate recovery stage 104 as mentioned above. The method includes recovering ammonia ($NH_4Cl$) and sulfate ($SO_4^{2-}$) content in the presence of Calcium Oxide (CaO) in an electrocoagulation cell wherein sulfate precipitation and ammonia stripping occurred through an electrochemical process with aluminum electrodes in the ammonia and sulfate recovery stage 106. The method includes recovering the sulfate content as a solid product. The method includes filtering to isolate the sulfate content as gypsum. The method further includes drying the gypsum and identifying and analysing the gypsum for presence of the extracted powder compound from reject brine (ERP-RB). At the end of the ammonia & sulfate recovery stage 106 the method 100 yields the EPC-RB. This EPC-RB is further used to make the sustainable hybrid composite by reinforcing the same with PLA.

In accordance with an embodiment of the present invention, a 1000 ml reject brine solution sample was systematically mixed with $NH_4OH$ solution at specific molar ratios (3.34 $NH^{3-}$:1 NaCl) over a five-minute duration to induce the precipitation of magnesium content. This process involved the reaction of the ammonium with magnesium carbonate (MgCO3), a predominant component in the rejected brine. The resultant reaction yielded a composite of $NH_4HCO_3$ and magnesium hydroxide. The initial pH of the brine-ammonia mixture was monitored, followed by a 24-hour agitation period on a shaker at a controlled temperature of 15° C. Post-shaking, the samples underwent filtration utilizing the Buchner funnel setup, and the accrued solids were subjected to drying at 120° C. for 24 hours.

Further, the treated brine underwent a reaction with a $CO_2$ air gas mixture in accordance with the Solvay process, employing a novel Inert Particle Spouted Bed Reactor (IPSBR). The reaction concluded when the $CO_2$ concentration at the reactor gas outlet matched its inlet value, indicating saturation. Further, the collected mixture separated liquid from solids using a filter action process. In this stage, a novel recovery process for ammonia (NH4Cl) and sulfate ($SO_4^{2-}$) content was introduced. The recover process utilizes compact sulfate chemical precipitation and ammonia stripping in the presence of CaO. Unlike conventional methods, this process occurred within a closed electrocoagulation cell, consolidating the recovery steps. Treated brine from previous stage, post-filtration, was introduced into the electrocoagulation cell, initiating reactions to mainly recover sulfate as gypsum ($CaSO_4$) products which considered the main component of the EPC-RB product.

Further, within the electrocoagulation cell, the compact sulfate precipitation and ammonia stripping occurred through an electrochemical process with aluminum electrodes. The current was applied after adding CaO to the treated brine, with a concentration of 3.5 g/100 ml brine. The electrochemical reaction persisted for five hours to maximize over all recovery. After each run, the treated brine underwent a settling period of 24 hours for complete coagulation at room temperature, followed by filtration using a Buchner funnel kit to isolate solid coagulants. A flow chart of the described process stages is presented in FIG. 1. Subsequently, the solid products (EPC-RB) were dried at 120° C. for 24 hours and subjected to identification and analysis.

Figure 2:
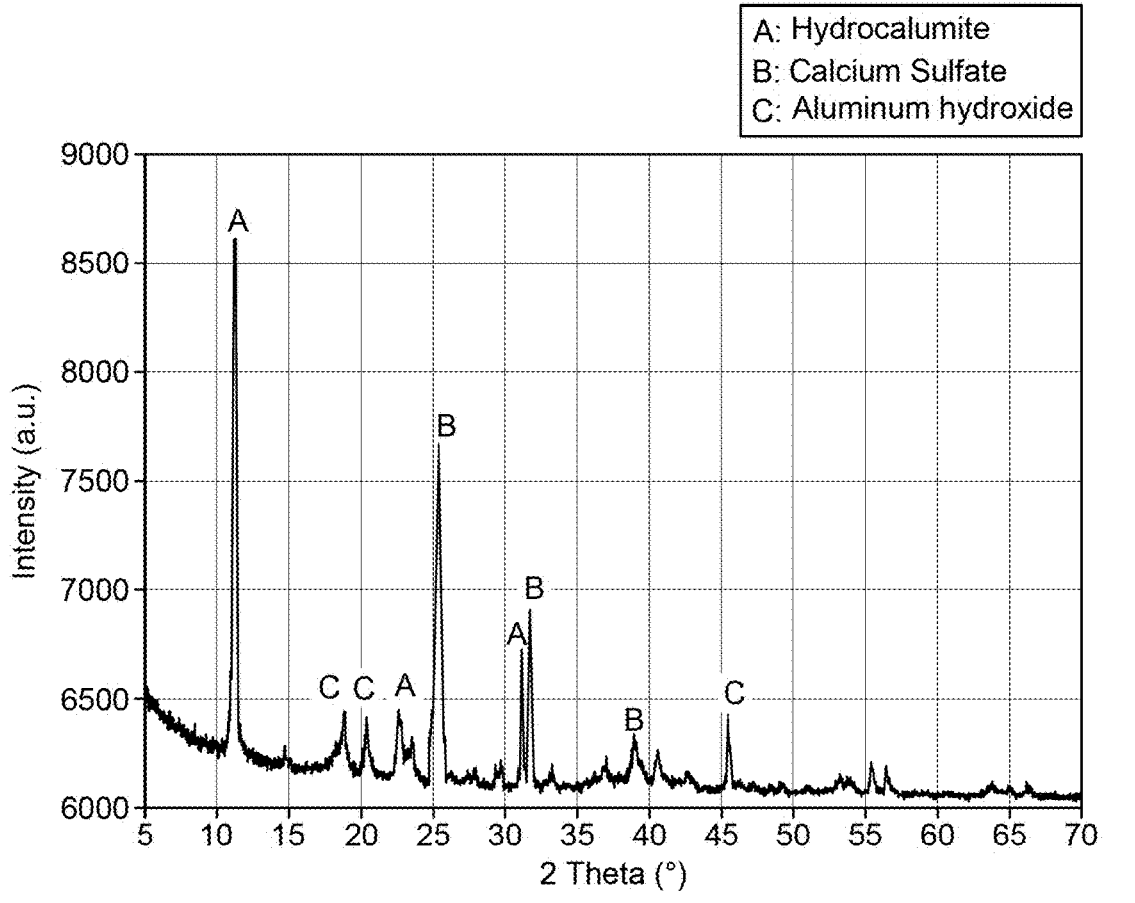
FIG. 2 illustrates a graphical representation of the XRD analysis for the collected solids (EPC-RB) from the ammonia and sulfate recovery stage, in accordance with an embodiment of the present invention.

Subsequently, in accordance with an embodiment, the present invention discloses various analysis that showed that the isolated sulfate content obtained in the above process was gypsum, which is the main component of the EPC-RB. The XRD analysis for the collected solids (EPC-RB) from the ammonia and sulfate recovery stage was conducted (as shown in FIG. 2) that showed that the electrochemical treatment using aluminium electrodes was applied to the clarified effluent from the second stage. FIG. 2 illustrates a graphical representation of the XRD analysis for the collected solids (EPC-RB) from the ammonia and sulfate recovery stage, in accordance with an embodiment of the present invention. The confirmation of sulfate ($SO_4^{2-}$) product recovery was evident through the presence of calcium sulfate (Anhydrite—$CaSO_4$), with the most intense peaks observed at two thetas of 25.5, 31.37, and 38.64. Additionally, the presence of $Al(OH)_2$ was identified by peaks marked with the symbol C in FIG. 2. It is noteworthy that the low intensity of these peaks ($Al(OH)_2$) indicates a low concentration in the recovered solid. Additionally, the identification of Hydrocalumite ($Ca_3Al_2(OH)_3XH_2O$), a complex compound, suggests the potential influence of the electrocoagulation process in recovering Ca2+ ions.

Figure 3:
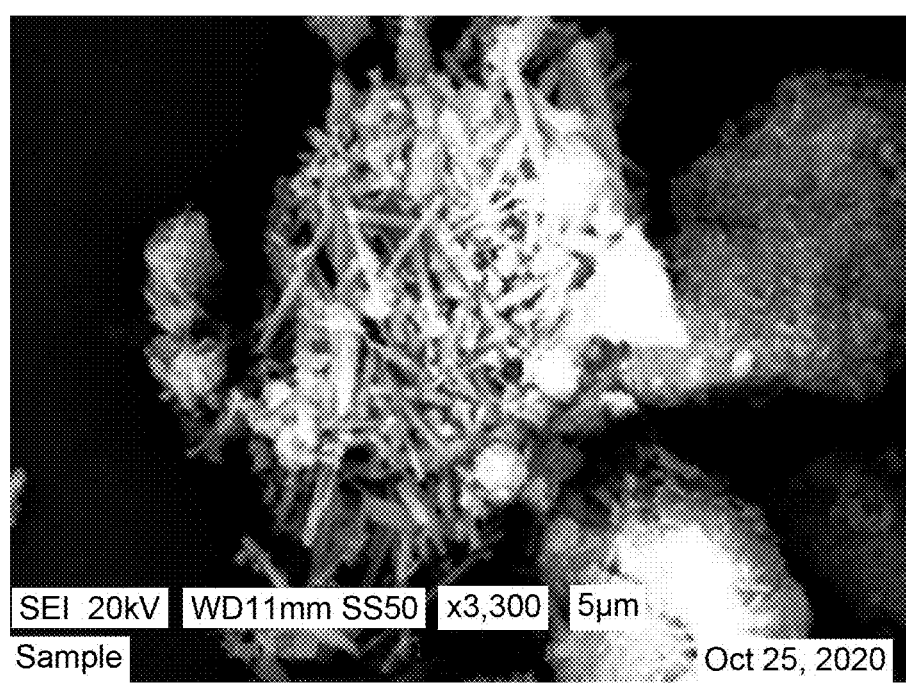
FIG. 3 illustrates a pictorial representation of the results from Scanning Electron Microscope (SEM) analysis for the produced solids (EPC-RB) from the ammonia and sulphate recovery stage, in accordance with an embodiment of the present invention.

Moreover, in accordance with an embodiment, the present invention discloses a Scanning Electron microscopy (SEM) analysis of the collected solids (EPC-RB) from the ammonia and sulfate recovery stage that revealed diverse morphological structures, including moderate-sized needles and small shells surrounding a few rhombic crystals. FIG. 3 illustrates a pictorial representation of the results from Scanning Electron Microscope (SEM) analysis for the produced solids (EPC-RB) from the ammonia and sulphate recovery stage, in accordance with an embodiment of the present invention. The needle morphology is likely associated with the $CaSO_4$ component (gypsum), while the presence of shells and lamellar structures is indicative of aluminum hydroxide. It has been substantiated that this particular morphology forms exclusively under high pH conditions, as observed in this stage where CaO is introduced to promote sulfate precipitation, resulting in a starting pH exceeding 11 during the initiation of the electrocoagulation process.

Figure 4:
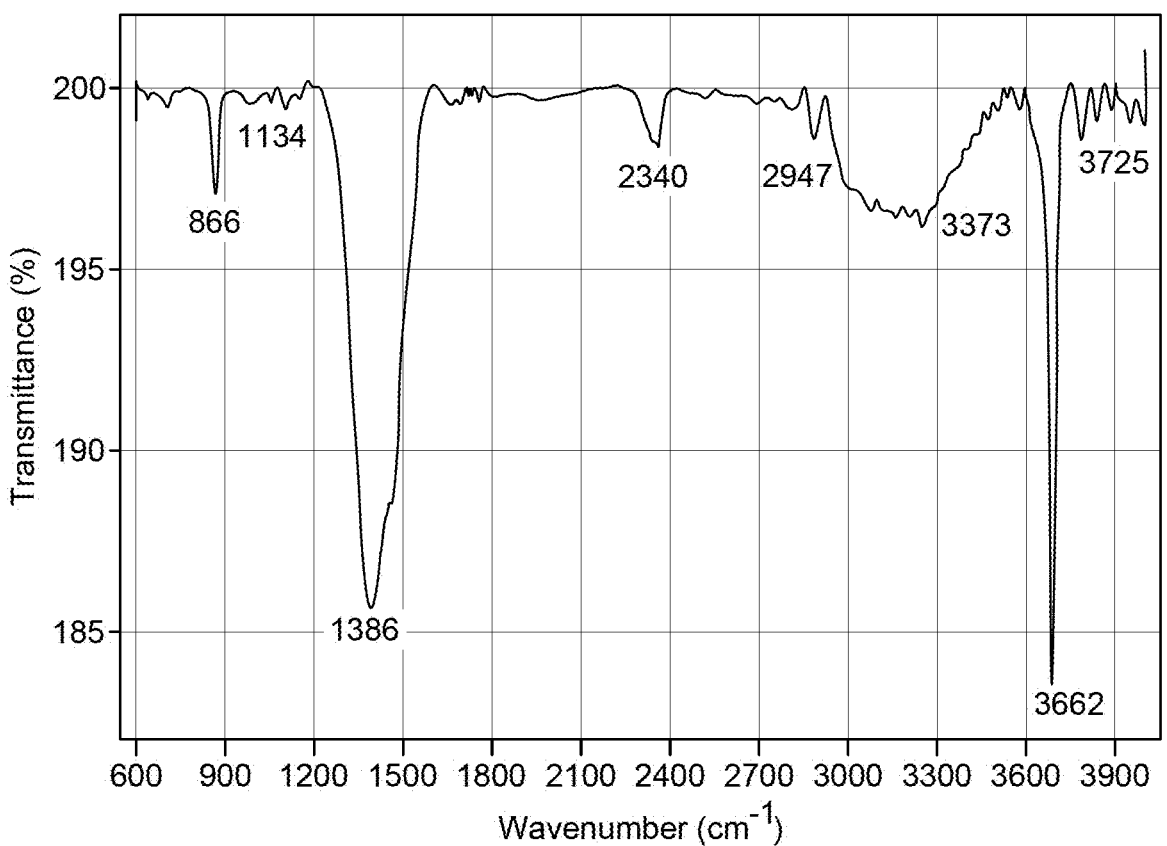
FIG. 4 illustrates a graphical representation of results from a Fourier-transform infrared spectroscopy (FTIR) analyses for the produced solids (EPC-RB) from the ammonia and sulphate recovery stage, in accordance with an embodiment of the present invention.

Additionally, in accordance with an embodiment, the present invention discloses a Fourier-transform infrared spectroscopy (FTIR) analysis of the collected solids (EPC-RB) from the ammonia and sulfate recovery stage showed spectra obtained within the range of 500-4000 $cm^{-1}$ at a spectral resolution of 4 $cm^{-1}$ with 34 scans. FIG. 4 illustrates peaks at wavenumbers 1666, 1463, 1097, and 866 $cm^{-1}$, associated with $CaSO_4$, while peaks at wavenumbers 3622, 3563, 3390, and 991 $cm^{-1}$ are linked to $Al(OH)_3$. Additionally, peaks at wavenumbers 3679, 2956, 2340, and 1386 $cm^{-1}$ are attributed to the complex $Ca_3Al_2(OH)_2$. These wavenumbers align well with pure components, specifically 1625, 1447, 1134, and 875 $cm^{-1}$ for $CaSO_4$, 3725, 3620, 3373, and 1016 $cm^{-1}$ for $Al(OH)_3$, and 3662, 2947, 2321, and 1376 $cm^{-1}$ for the complex ($Ca_3Al_2(OH)_2$).

Figures 5A, 5B:
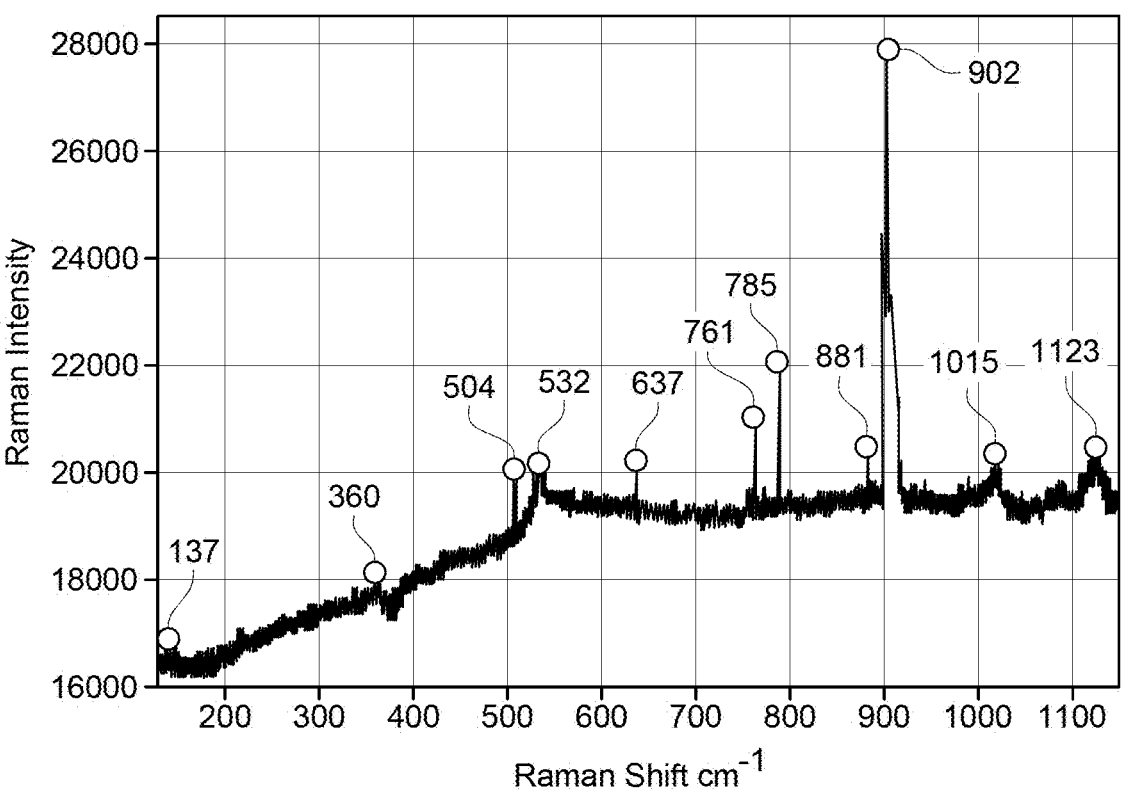
FIG. 5A illustrates a table of the results from the Raman Analysis for the collected solids (EPC-RB) from the multi-stage desalination process, in accordance with an embodiment of the present invention.
FIG. 5B illustrates a graphical representation of the results from the Raman Analysis for the collected solids (EPC-RB) from the multi-stage desalination process, in accordance with an embodiment of the present invention. The graphical representation further illustrates the peaks observed in the Raman Spectrum for the EPC-RB solids collected from ammonia and sulfate recovery stage in comparison with the matching peaks in the pure state for each component.

Furthermore, in accordance with an embodiment, the present invention discloses the Raman analysis of the collected solids (EPC-RB) from the multi-stage desalination process wherein (Table as illustrated in FIG. 5A and FIG. 5B) the Raman spectrum obtained for the EPC-RB solids gathered from stage three in comparison with the pure state spectrum of each anticipated component. Any deviation from the frequency observed in a pure state is attributed to the coexistence of multiple components within the same solid sample.

As described above the EPC-RB may be formed from the reject brine solution. In accordance with an embodiment, the invention discloses producing a Biodegradable Composite from a Biodegradable Polymer (PLA) Reinforced with Extracted Powder Compound from Reject Brine (EPC-RB). This procedure describes two main stages for preparing samples for tensile and compressive testing, as well as the mechanical properties of the testing.

In accordance with an embodiment of the present invention, the tensile testing sample are prepared as described below.

At first step, the method includes getting the Extracted Powder Compound from Reject Brine (EPC-RB) from the brine solution by drying 400 ml in the over at 104° C. for 24 hr or until it is fully dry. Further, the samples were prepared at different mixing ratios of between EPC-RB and a biodegradable polymer (PLA) at the temperature of 179.4° C. based on melting point of PLA, mixed for 10 min with 90 RPM. EPC-RB added were in the ratio 5%, 10%, 15%, 20%, 25%, 30%, and 35. These samples were then injected at a temperature of 179.4° C. into a dog-bone shaped mold for conducting the tensile test.

Figure 6:
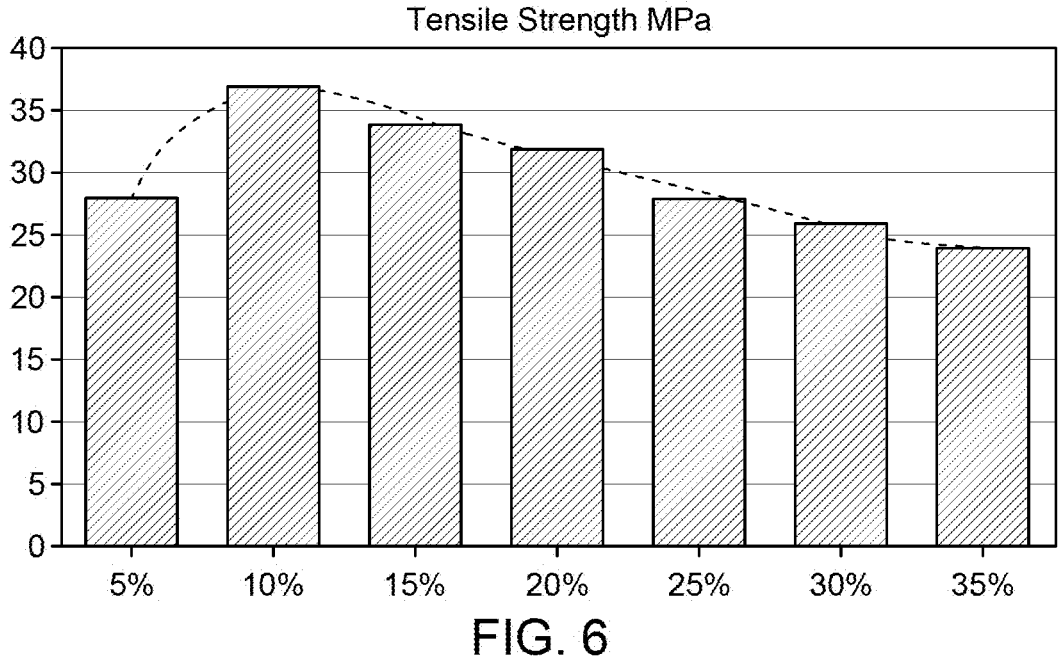
FIG. 6 illustrates a bar graph showing that the composite material contains 10% of EPC-RB reaches its maximum strength at 37 MPa indicating that the addition of EPC-RB at this concentration enhances the tensile strength of the composite material and it starts to decrease beyond the 10% concentration of EPC-RB, in accordance with an embodiment of the present invention.

Observations: The composite material under examination consists of PLA as the matrix material, with EPC-RB mixed with it. It was observed that the composite contains 10% of EPC-RB reaches its maximum strength at 37 MPa. This indicates that the addition of EPC-RB at this concentration enhances the tensile strength of the composite material. It is noted that after reaching the peak strength at 10% EPC-RB, the strength of the composite material begins to decrease. This decline in strength suggests that there might be an optimal concentration or ratio of EPC-RB beyond which its beneficial effects diminish or even become detrimental to the mechanical properties of the composite. FIG. 6 illustrates a bar graph showing that the composite material contains 10% of EPC-RB reaches its maximum strength at 37 MPa indicating that the addition of EPC-RB at this concentration enhances the tensile strength of the composite material and it starts to decrease beyond the 10% concentration of EPC-RB, in accordance with an embodiment of the present invention.

In accordance with an embodiment of the present invention, the compressive testing sample are prepared as described below.

At first step, the method includes getting the Extracted Powder Compound from Reject Brine (EPC-RB) from the brine solution by drying 400 ml in the over at 104° C. for 24 hr or until it is fully dry. Further, the samples were prepared at different mixing ratios of between EPC-RB and a biodegradable polymer (PLA) at the temperature of 179.4° C. based on melting point of PLA, mixed for 10 min with 90 RPM. EPC-RB added were in the ratio 5%, 10%, 15%, 20%, 25%, 30%, and 35%. These samples were then injected at a temperature of 179.4° C. into a cylinder shaped mold for conducting the tensile test. Then samples were grinded to a length of 20.05 mm, 20.06 mm, 22.16 mm, 22.10 mm, 22.01 mm, 22.06 mm, and 19.53 mm.

Figure 7:
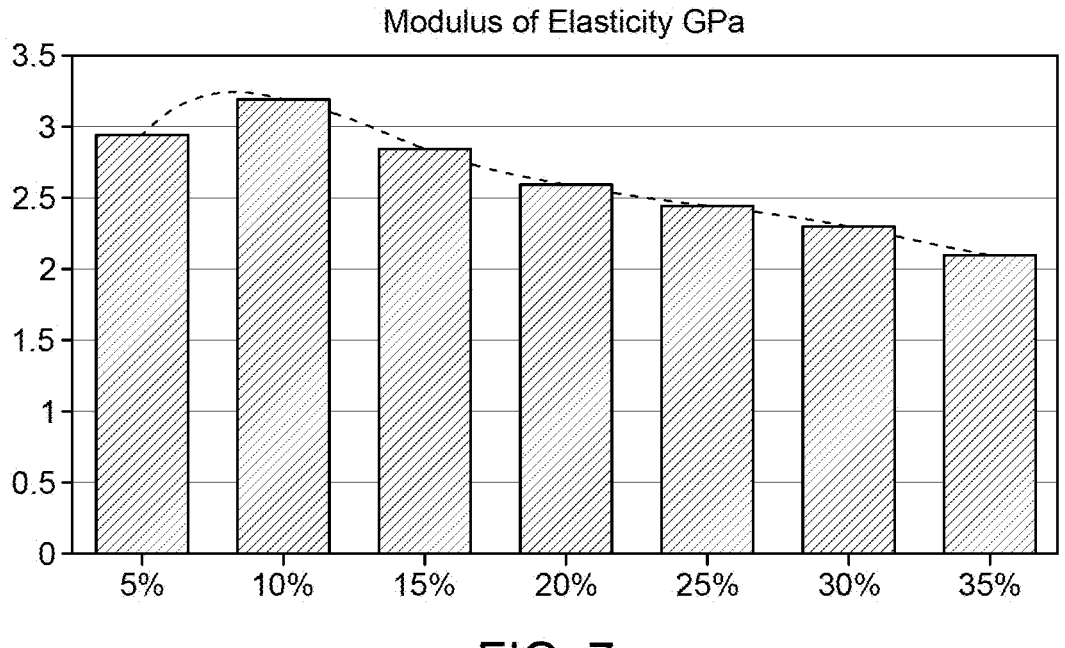
FIG. 7 illustrates a bar graph showing that the modulus of elasticity reaches its maximum value 3.2 GPa at 10% EPC-RB and starts to decrease beyond the 10% concentration of EPC-RB, in accordance with an embodiment of the present invention.

Regarding the compressive strength, it was observed that the max value at 30% EPC-RB reaches 40.1 MPa and reduces after that. On the other hand, the modulus of elasticity at compression has a max value of 30% as well at 3 GPa. This indicates that the addition of EPC-RB at this concentration enhances the compressive strength and Elastic modulus in compression of the composite material. It is noted that after reaching the peak strength at 30% EPC-RB, the strength of the composite material begins to decrease. FIG. 7 illustrates a bar graph showing that the modulus of elasticity reaches its maximum value 3.2 GPa at 10% EPC-RB and starts to decrease beyond the 10% concentration of EPC-RB, in accordance with an embodiment of the present invention. This is further described by the experiment mentioned below.

Moreover, in accordance with an embodiment of the present invention, the composition and properties of the hybrid composite material can be tailored based on the specific requirements of different applications. By adjusting the ratio of polymer to reinforcement and incorporating different types of extracted powder compounds (EPC-RB), the composite may be optimized for various uses. Further, the sustainable hybrid composite material obtained from the process is stronger, more durable, and biodegradable.

Additionally, in accordance with an embodiment of the present invention, the stages of producing Sustainable Composite from Biodegradable Polymer (PLA) and Extracted Powder Compound from Reject Brine describes two main steps for preparing samples for Tensile and Compressive Testing, as well as the Mechanical Properties of the testing. Consequently, the results disclose that the composite contains 10% of EPC-RB reaches its maximum strength at 37 MPa. This indicates that the addition of EPC-RB at this concentration enhances the tensile strength of the composite material.

In accordance with an embodiment of the present invention, reinforcing the Extracted Powder Compound from Reject Brine (EPC-RB) in Biodegradable Polymer (PLA) in different ratios enhances the tensile strength, the stiffness (Modulus of Elasticity), the compressive strength, and the bending strength, thermal conductivity, heat capacity, or thermal expansion of the developed sustainable hybrid composite material that further increases the mechanical, thermal, and other properties of the developed sustainable hybrid composite material, contributing to its biodegradability. This makes the composite material with improved property more environment friendly.

Furthermore, in accordance with an embodiment of the present invention, there is an optimal concentration or ratio of EPC-RB, which is 10%, beyond which its beneficial effects diminish or even become detrimental to the mechanical properties of the composite because after reaching the peak strength at 10% EPC-RB, the strength of the composite material begins to decrease. The sustainable composite material containing 10% of EPC-RB reaches its maximum strength at 37 MPa indicating that the addition of EPC-RB at this concentration enhances the tensile strength of the composite material. Similarly, the same concentration of EPC-RB (10%) peaks the modulus of elasticity in tension, and compressive strength and elastic modulus in compression and it starts to decrease beyond the 10% concentration of the EPC-RB.

Additionally, in accordance with an embodiment of the present invention, regarding the compressive strength the max value at 30% EPC-RB reaches 40.1 MPa and reduces after that. Also, the modulus of elasticity at compression has a max value of 30% as well at 3.2 GPa. Therefore, the optimal concentration or ratio of EPC-RB is 30% for increasing the Compressive strength and Modulus of Elasticity.

In accordance with an embodiment of the present invention, the compressive strength and Elastic Modulus in Compression sample are prepared as described below.

At a first step the samples were prepared at different mixing ratios of between EPC-RB and a biodegradable polymer (PLA) at the temperature of 179.4° C. based on melting point of PLA, mixed for 10 min with 90 RPM. EPC-RB added were in the ratio 5%, 10%, 15%, 20%, 25%, 30%, and 35%. These samples then injected at a temperature of 179.4° C. into a cylindrical mold for conducting the tensile test. The sample was put in a hot press machine for 15 minutes at 10,000 kgs and 200° C. to get a uniform cylindrical shape.

Observation: Regarding the compressive strength, it was observed that the maximum value at 30% EPC-RB reaches 40.1 MPa and reduces after that. On the other hand, the modulus of elasticity at compression has a max value of 30% as well at 3 GPa. This indicates that the addition of EPC-RB at this concentration enhances the compressive strength and Elastic modulus in compression of the composite material. It is noted that after reaching the peak strength at 30% EPC-RB, the strength of the composite material begins to decrease.

In accordance with an embodiment of the present invention, the sustainable hybrid composite material can be optimized for plurality of uses by adjusting the ratio of polymer to reinforcement and incorporating plurality of extracted powder compounds from Reject Brine (EPC-RB). For example, a particular concentration of EPC-RB such as 8% when reinforced into PLA to form the sustainable hybrid composite may lead to an elasticity modulus value that is suitable for a particular application. Similarly, there may be different ratios of EPC-RB that may be used for different applications. The ratio of the EPC-RB may be tailored to the desired application based on desired tensile strength, bending strength, elasticity, stiffness, heat capacity, thermal conductivity, or thermal expansion required by a particular application. Additionally, various variants of EPC-RB may be used to create the sustainable hybrid composite for using in various applications.

Figure 8:
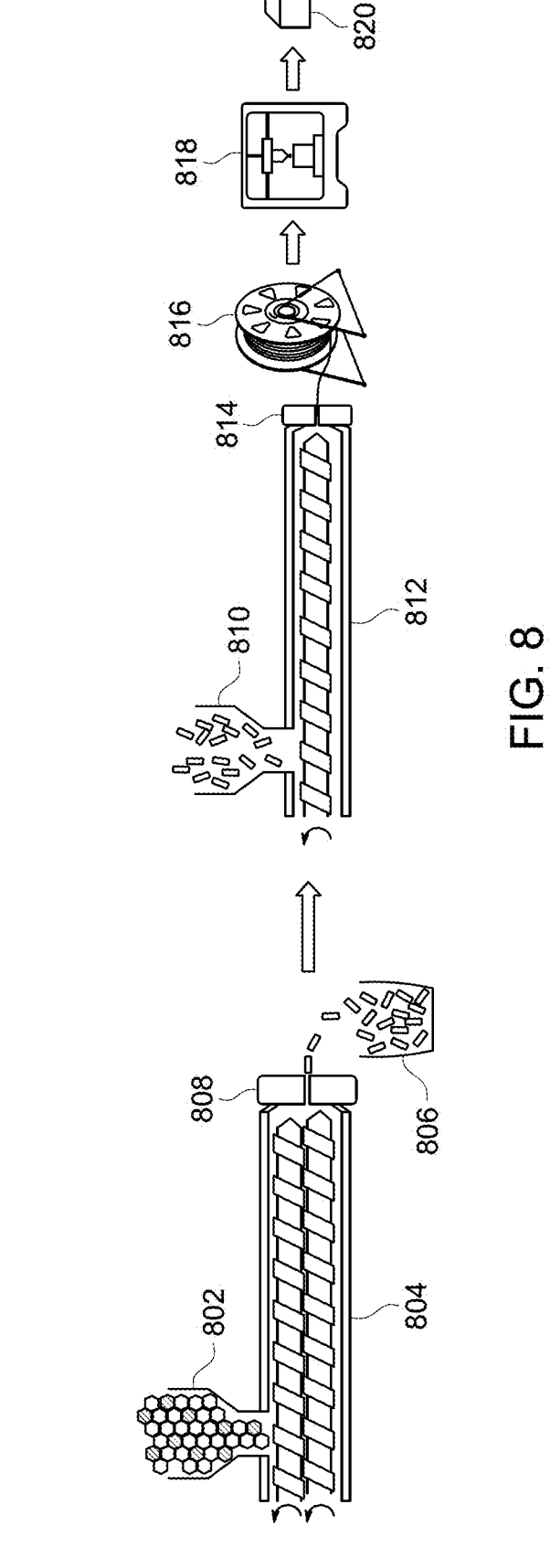
FIG. 8 illustrates a process diagram for making a sustainable hybrid composite using three-dimensional (3D) printing from a set of EPC-RB pellets, in accordance with an embodiment of the present invention.

FIG. 8 illustrates a process diagram for making a sustainable hybrid composite using three-dimensional (3D) printing from a set of EPC-RB pellets, in accordance with an embodiment of the present invention. As illustrated, the FIG. 8 comprises a process 800 that can be used in accordance with an embodiment of the present disclosure for the production of the sustainable hybrid composite. The process 800 includes an extruder 804. The extruder 804 may be a twin feed extruder or any other relevant extruder as would be clear to a person skilled in the art. The extruder 804 may be associated with a feeder 802 and a die 808. The feeder 802 is used for feeding EPC-RB and PLA inside the extruder 804. The extruder 804 forms EPC-RB pellets 806 from the EPC-RB and PLA received from the feeder 802. The EPC-RB pellets 806 are a variation of the sustainable hybrid composite created by mixing the EPC-RB with the PLA in the extruder 804. In an example, the EPC-RB pellets 806 are formed by combining the EPC-RB with PLA in the extruder 804. The die 808 is used to shape the EPC-RB pellets 806 as formed by the extruder 804. The die 808 may be of any shape size and thickness that may be optionally varied as desired by the user.

In accordance with an embodiment of the present invention, the EPC-RB pellets 806 are sent for testing and validation of mechanical, thermal, and other properties as described above with reference to FIG. 6 and FIG. 7. The EPC-RB pellets 806 are fed to an extruder 812 after testing and validation of the mechanical and thermal properties as stated above. The extruder 812 may be a single screw extruder or any other relevant extruder as would be clear to a person skilled in the art. The extruder 812 may be associated with a feeder 810 and a die 814. The feeder 810 is used for feeding the EPC-RB pellets 806 to the extruder 812. The extruder 812 extrudes the EPC-RB pellets through the die 814, which shapes the EPC-RB pellets 806 into a predefined shape such as a filament. The die 814 may be of any shape, size and thickness that may be optionally varied as desired by the user. Further, the EPC-RB filament is fed to a filament spooler 816. The filament spooler 816 would collect the EPC-RB filament and feed the same to a 3D-printer 818. The 3D-printer 818 may accord various shapes as desired by a user to the EPC-RB filament as received from the filament spooler 816 to form a set of 3D-printed parts 820. One skilled in the art would understand that any of the 3D-printing techniques and any of the 3D-printers known in the art can be used by the 3D-printer 818. The exemplary process 800 describes an embodiment of the invention and should not be used to limit the scope of the invention to creating only pellets, filaments, or 3D-printed parts from EPC-RB for creating the sustainable hybrid composite.

Therefore, it has been described with reference to the exemplary embodiments, from the above experiments that the specific concentration of EPC-RB reinforced into the PLA increases the tensile strength and compressive strength of the new composite material making it more biodegradable and further enhancing mechanical, thermal and other properties of the developed composite material. This results in a composite material that is stronger, more durable, and better suited for various applications. The composition and properties of the hybrid composite may be tailored based on the specific requirements of different applications. By adjusting the ratio of polymer to reinforcement and incorporating different types of extracted powder compounds (EPC-RB), the composite may be optimized for various uses. One significant aspect mentioned is the improvement in biodegradability. It is implied that including EPC-RB in the composite material contributes to its biodegradability, making it more environmentally friendly than pure PLA. This aspect is crucial in many applications, especially those concerning sustainability and environmental impact. Thus, the embodiment(s) of the present invention is advantageous and uses novel Extracted powder Compound from Reject brine which is extracted from brine solution to form a new composite material, unlike the existing conventional prior arts.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims. Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A process of extracting a powder compound from Reject Brine (EPC-RB) by:

mixing a sample of reject brine solution with Ammonium Hydroxide ($NH_4OH$) to form a treated brine solution;

reacting the treated brine solution with Carbon Dioxide ($CO_2$) air gas mixture;

filtering the collected mixture from the reacting step;

recovering ammonia ($NH_4Cl$) and sulfate ($SO_4^{2-}$) content in the presence of Calcium Oxide (CaO);

recovering the sulfate content as a solid product;

filtering to isolate the sulfate content as gypsum;

drying the gypsum; and identifying & analysing the gypsum for presence of the extracted powder compound from reject brine (EPC-RB), wherein recovering ammonia ($NH_4Cl$) and sulfate ($SO_4^{2-}$) content in the presence of Calcium Oxide (CaO) is done within a closed electrocoagulation cell.

2. A process for producing a Biodegradable Composite of polylactic acid polymer reinforced with extracted Powder Compound from Reject Brine (EPC-RB), which comprises extracting a powder compound from Reject Brine (EPC-RB) according to the process of claim 1, and mixing the extracted powder compound with polylactic acid polymer.

3. The process for producing a Biodegradable Composite of polylactic acid polymer (PLA) reinforced with extracted Powder Compound from Reject Brine (EPC-RB) as claimed in claim 2, wherein said Extracted Powder Compound from Reject Brine (EPC-RB) serves as a filler or reinforcement within a polylactic acid polymer matrix in a ratio of from 5% to 30% to produce a new hybrid composite material with at least one unique property.

4. A process as claimed in claim 2, which comprises:

mixing the extracted powder compound with polylactic acid polymer by dry-blending the EPC-RB with PLA and melt-compounding the blend at a temperature at or about the PLA melting point to form a homogeneous composite; and forming a test article from the composite, wherein forming comprises at least one of (a) pelletization followed by extrusion into a filament and three-dimensional (3D) printing of a part, and (b) injection molding of standardized mechanical test specimens.

5. The process as claimed in claim 1, wherein the Extracted Powder Compound is produced from Reject Brine generated as a waste product of an industrial process.

6. A process as claimed in claim 5 wherein, the industrial process includes desalination, mining, and chemical production.

7. A process as claimed in claim 1, wherein gypsum ($CaSO_4$) is the main component of the EPC-RB.

8. A process as claimed in claim 1, wherein the sample of reject brine solution comprises a 1000 ml reject brine solution sample which is mixed with $NH_4OH$ solution at specific molar ratios (3.34 NH3:1 NaCl) to induce the precipitation of magnesium content.

9. A process as claimed in claim 8, wherein mixing a sample of reject brine solution with Ammonium Hydroxide ($NH_4OH$) induces precipitation of magnesium content, and the resultant reaction yields a composite of $NH_4HCO_3$ and magnesium hydroxide.

10. A process for producing a Biodegradable Composite of polylactic acid polymer reinforced with extracted Powder Compound from Reject Brine (EPC-RB), which comprises mixing a composition obtained as a result of the process claimed in claim 8 with polylactic acid polymer at a ratio of 10% of the composition in the polylactic acid polymer to enhance the tensile strength of the developed sustainable hybrid composite material.

11. A process for producing a Biodegradable Composite of polylactic acid polymer reinforced with extracted Powder Compound from Reject Brine (EPC-RB), which comprises mixing a composition obtained as a result of the process claimed in claim 8 with polylactic acid polymer at a ratio of 10% of the composition in the polylactic acid polymer to enhance the stiffness (Modulus of Elasticity) of the developed sustainable hybrid composite material.

12. A process for producing a Biodegradable Composite of polylactic acid polymer reinforced with extracted Powder Compound from Reject Brine (EPC-RB), which comprises mixing a composition obtained as a result of the process claimed in claim 8 with polylactic acid polymer at a ratio of 30% of the composition in the polylactic acid polymer to enhance the compressive strength and Elastic modulus in compression of the developed sustainable hybrid composite material.

13. A process as claimed in claim 1, wherein the sample of reject brine contains dissolved salts, minerals, and waste compounds.

14. The process of claim 13, wherein the extraction yields an EPC-RB powder comprising calcium sulfate as its principal phase and minor phases comprising aluminum hydroxide and/or hydrocalumite detectable by spectroscopic analysis.

15. A process as claimed in claim 13, wherein the extraction yields an EPC-RB powder comprising diverse morphological structures, including needles and shells surrounding rhombic crystals.

16. A process as claimed in claim 13, wherein the extraction yields an EPC-RB powder comprising aluminum hydroxide in the form of shells and lamellar structures.

17. The process of claim 1, wherein the EPC-RB thus obtained is provided as a particulate powder comprising gypsum that exhibits needle-like morphology and is suitable for direct melt-compounding with a biodegradable polymer to form a biodegradable composite.

* * * * *